May 15, 1923.

J. DLESK

HOLDER FOR REAMERS

Filed May 12, 1920

1,455,480

Inventor:
John Dlesk,
By Dyrenforth, Lee, Chritton & Wiles
Att'ys.

Patented May 15, 1923.

1,455,480

UNITED STATES PATENT OFFICE.

JOHN DLESK, OF BERWYN, ILLINOIS, ASSIGNOR TO U. S. BALL BEARING MANUFACTURING COMPANY, OF CHICAGO, ILLINOIS, A CORPORATION OF ILLINOIS.

HOLDER FOR REAMERS.

Application filed May 12, 1920. Serial No. 380,823.

*To all whom it may concern:*

Be it known that I, JOHN DLESK, a citizen of the United States, residing at Berwyn, in the county of Cook and State of Illinois, have invented a new and useful Improvement in Holders for Reamers, of which the following is a specification.

Figure 1:
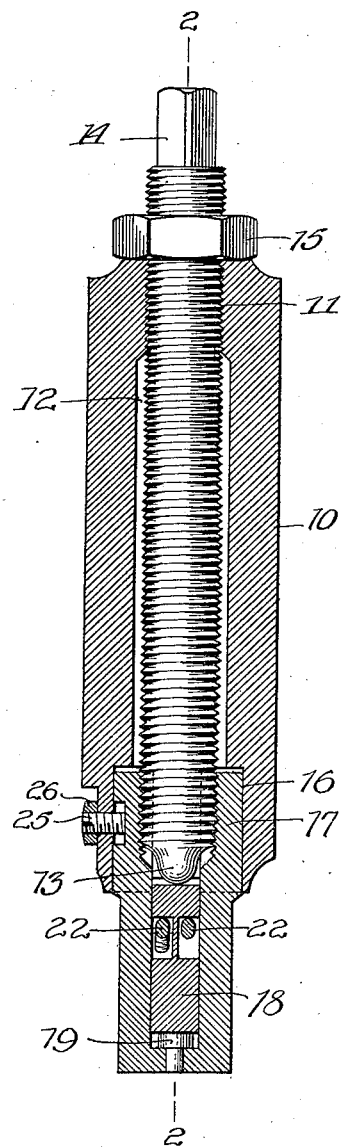
Figure 2:
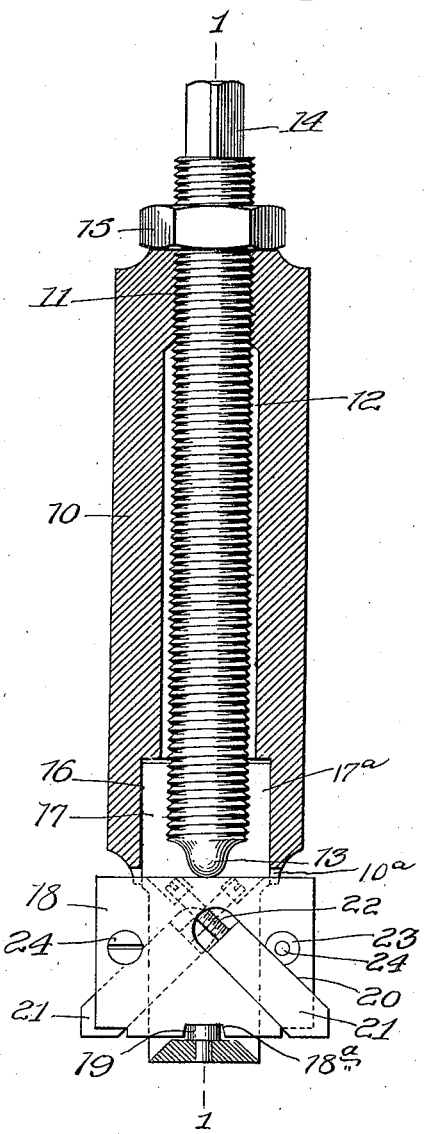

This invention relates to holders for reamers and the like and is fully described in the following specification and shown in the accompanying drawing in which Figure 1 is a longitudinal section of a holder with a reamer body in place therein and Figure 2 is a longitudinal section taken at right angles to that of Figure 1.

The embodiment of the invention as illustrated consists of a hollow tubular member 10, having screw threads 11 formed in one end into which is threaded a screw 12 having one end rounded as at 13 and the other end preferably squared as in 14 to receive a wrench. A lock-nut 15 is also supplied for locking the screw at any adjusted position.

The other end of the holder 10 is counter bored at 16 to receive the rounded end of the holder head 17. The holder head is slotted at 17ª to receive the reamer body 18 and has a centrally located pin 19 therein which is adapted to engage an opening 18ª in the reamer body. The height of the head of the pin 19 is greater than the depth of the opening 18ª so that the reamer body will have a tendency to rock thereon.

The opposite edge of the reamer body is engaged by the rounded end 13 of the screw 12. The open end of this holder head 17 is also threaded to receive this end of the screw 12.

The reamer body is of a well known type and consists of a block of metal having angularly placed guide ways 20 therein in which are closely fitted the cutting tools 21 which are adjusted by means of screws 22. These tools may be locked in any desired manner as by means of tapered gib-bushings 23 and screws 24. The reamer body is prevented from turning in the holder by the shoulder 10ª.

A screw 25 is threaded thru a hole in the end of the member 10 and bears upon the inner end of the holder head 17. By tightening this screw the holder head grips the reamer body so as to prevent chattering. A lock nut 26 is added to prevent the screw from turning.

The method of operation of this tool is as follows:

The cutting tools 21 are first assembled in the reamer body 18 and this is then assembled as shown in the holder 10, which is then clamped in the tool holder of a lathe while the piece to be reamed is clamped to the lathe face plate with the hole therein on the lathe axis. The reamer may then be fed into the work in the usual manner. As the tools 21 engage the side walls of the hole, the side pressure may be unequal upon the two tools, thereby causing the reamer body 18 to rock somewhat or to slide bodily to one side until the pressure upon the two is equalized. This is permitted by the rounded screw end 13 and the opening 18ª which is slightly wider that the pin 19. Thus, the reamer body will automatically adjust itself to any slight inequality in the setting of the tools 21. The pressure on the reamer body and hence the ease with which it slides is regulated by the screw 25.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. A holder for a rectangular shaped reamer body having oppositely disposed cutters comprising a transversely slotted member closed at one end, a centrally located projection in said closed end adapted to engage a central opening in the reamer body, a tubular member enclosing the open end of said slotted member and a screw threaded into the open end of said slotted member and bearing upon said reamer body.

2. A holder for a rectangular shaped reamer body having oppositely disposed cutters comprising a transversely slotted member closed at one end, a centrally located projection in said closed end adapted to engage a central opening in the reamer body, a tubular member enclosing the open end of said slotted member, a screw connecting said tubular member and said slotted member and bearing upon said reamer body, and a means for locking said screw against turning movement.

3. A holder for a rectangular shaped reamer body having oppositely disposed cutters comprising a transversely slotted member closed at one end and open at the other end, a centrally located projection in said closed end adapted to engage a central opening in the reamer body, a tubular member enclosing the open end of said slotted member, a screw threaded into the open end of said slotted member and bearing upon said reamer body, a shoulder on said holder for preventing turning of said reamer body and means for clamping said open end of the slotted member to give a lateral gripping action to the reamer body.

4. A holder for a rectangular shaped reamer body having oppositely disposed cutters comprising a transversely slotted member closed at one end, a centrally located projection in said closed end adapted to engage a central opening in the reamer body, a tubular member enclosing the open end of said slotted member, a screw threaded into the open end of said slotted member and bearing upon said reamer body, a shoulder on said holder for preventing turning of said reamer body a screw for clamping said open end of the slotted member to give a lateral gripping action to the reamer body.

JOHN DLESK.